United States Patent [19]

Snow

[11] 4,145,076

[45] Mar. 20, 1979

[54] CONNECTING MEMBER FOR LUBRICATION SYSTEM

[75] Inventor: John P. Snow, Sagamore Hills, Ohio

[73] Assignee: Samuel Moore and Company, Aurora, Ohio

[21] Appl. No.: 828,104

[22] Filed: Aug. 26, 1977

Related U.S. Application Data

[63] Continuation of Ser. No. 668,240, Mar. 18, 1976.

[51] Int. Cl.$^2$ ............................................. F16L 21/04
[52] U.S. Cl. ...................................... 285/94; 285/175; 285/179; 285/305
[58] Field of Search ............... 285/164, 305, 261, 271, 285/369, 175, 94, 179

[56] References Cited

U.S. PATENT DOCUMENTS

| | | | |
|---|---|---|---|
| 1,019,000 | 2/1912 | Watson | 285/305 |
| 1,838,549 | 12/1931 | Herb | 285/271 X |
| 1,871,421 | 8/1932 | Muhlhausen et al. | 285/305 X |

FOREIGN PATENT DOCUMENTS

| | | | |
|---|---|---|---|
| 1425470 | 5/1960 | Fed. Rep. of Germany | 285/305 |
| 247283 | 12/1926 | Italy | 285/164 |

Primary Examiner—Dave W. Arola
Attorney, Agent, or Firm—Stevens, Davis, Miller & Mosher

[57] ABSTRACT

A connecting member is provided for connecting an automatic lubricating system to the conventional lubrication fittings provided for lubricating the bearings of a motor vehicle. The connecting member has a bore shaped to fit snugly about the head of the fitting and a bore between the check valve of the fitting and a feed line or other source of lubricant. The head of the fitting is pressed against an O-ring in the connecting member to seal the interface therebetween and is held in position by a removable wire clip which extends through the connecting member and against the shoulder of the fitting.

18 Claims, 7 Drawing Figures

U.S. Patent  Mar. 20, 1979  Sheet 1 of 2  4,145,076
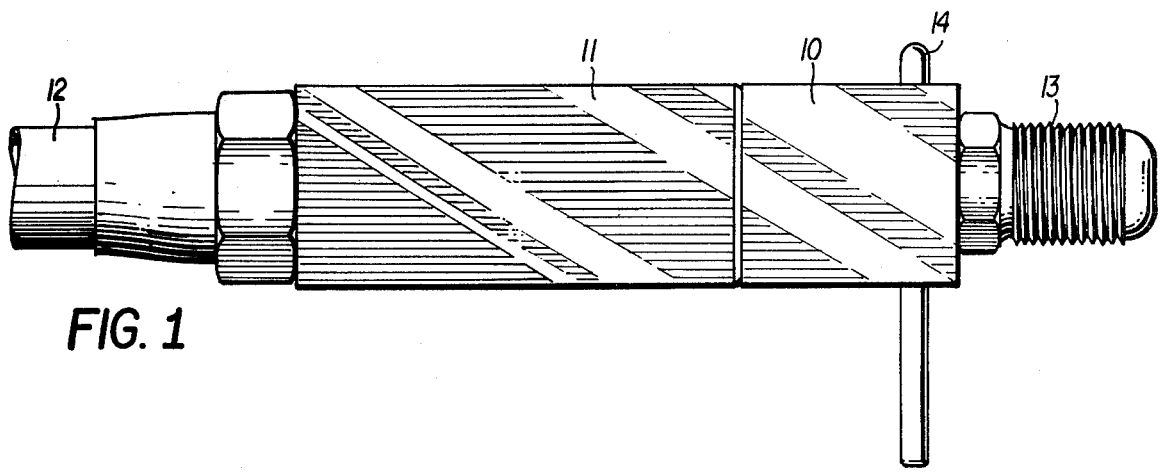
FIG. 1
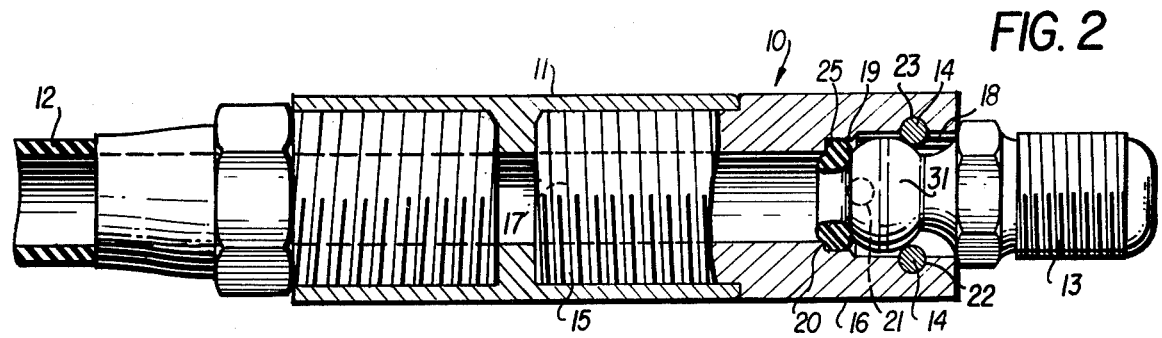
FIG. 2
FIG. 3
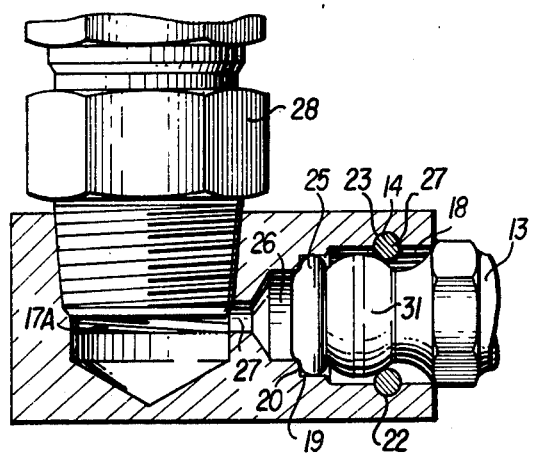
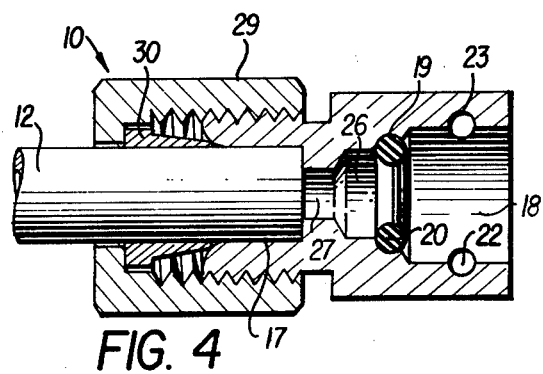
FIG. 4

CONNECTING MEMBER FOR LUBRICATION SYSTEM

This is a continuation of application Ser. No. 668,240 filed Mar. 18, 1976.

This invention relates generally to a coupling member for connecting a lubrication fitting to a source of lubricant and more particularly to a quick release, reusable and rotatable coupling member for connecting a lubrication fitting for a bearing of a vehicle with a source of lubricant.

Automotive vehicles and particularly trucks, buses and tractor-trailer rigs are frequently provided with a lubrication system in which a source of lubricant is connected to fittings associated with bearings or other parts of the vehicle which require lubrication. Such lubrication systems include a reservoir for lubricant, metering means, a pump and conduits connecting the reservoir, pump and the metering means to the fittings. The most common fittings are Zerk type fittings which may be connected directly to an end of a feed line or may be connected through a metering valve to the feed line of the lubrication system. One lubricating system of this type which can be used to advantage is described in U.S. Pat. No. 3,659,675 granted May 2, 1972. A similar lubricating system and a metering valve adapted to be used in the system are disclosed in U.S. Pat. No. 3,809,184.

The specifications for lubrication fittings for the bearings of motor vehicles are set forth in "Lubrication Fittings — SAE J534c, SAE Standard" published at pages 735–737 in "Society of Automotive Engineers, Tube, Pipe, Hose and Lubrication Fittings" — Handbook supplement HS-150, 1975 edition. Such fittings have either a threaded end or a press-type end for connecting them to the vehicle and an exposed head provided with a ball check valve for attachement to a source of lubricant.

One disadvantage heretofore existing with such threaded or press-type lubrication fittings has been the costly and time-consuming practice of having to remove them for replacement with conventional adapter means before connecting a feed line member thereto. In the case of press-type lubrication fittings it has been necessary to drill and thread the bore from which the lubricator fitting has been taken in order to attach conventional adapter means.

Snap-on and screw type connectors for connecting the lubricant feed lines to the bearings have been proposed before. For example, connectors of these types are described and illustrated in a "Service Manual, Air Powered Systems For Trucks and Busses" entitled "Multi-Lube Power Lubrication Systems" distributed by Lincoln Engineering Co. of St. Louis, Mo. The disclosed connectors have a C-ring for coupling the connector to the fitting and a resilient plug enclosed by the connector body. The plug has a conduit which connects with the head of the lubrication fitting when the connector is pressed on the lubrication fitting with its end against the resilient plug. Such connectors have the disadvantage that they cannot be used again after they have been separated from a fitting.

It is, therefore, an object of this invention to provide an improved quick release connecting member for connecting a source of lubrication of a lubrication source which is easily disconnected and can be reused after it has been disconnected. Still another object of the invention is to provide a connecting member for connecting a lubrication feed line of a lubrication system to various typs of lubrication fittings complying with SAE standards. Still another object is to provide an improved quick release connecting member for a lubrication fitting not requiring removal of said lubrication fitting for substitution thereof of conventional adapter means.

Other objects will become apparent from the following description with reference to the accompanying drawing wherein FIG. 1 is a side elevation of one embodiment of the invention as it appears when connecting a Zerk type lubrication fitting to a lubrication feed line of a lubrication system;

FIG. 2 is a longitudinal section through the assembly of FIG. 1;

FIG. 3 is a longitudinal section through a second embodiment of the connecting member provided by the invention with a Zerk fitting and a feed line shown in elevation;

FIG. 4 is a longitudinal section through still another embodiment of the invention shown with a feed line of a lubrication system;

Figure 5:
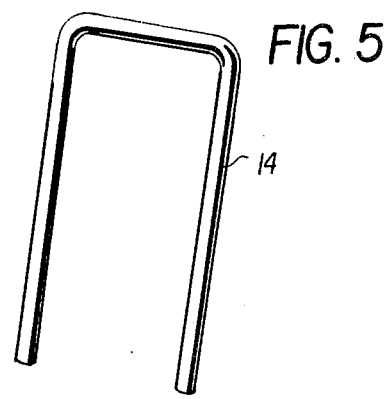
FIG. 5 is a perspective view of the clip used in the connecting member of the invention.

The foregoing objects and others are accomplished in accordance with this invention, generally speaking, by providing a coupling or connecting member having one end portion for threadably or otherwise securing the connecting member to a lubrication feed line or other source of lubricant and a body portion, a cavity extending inwardly into the body portion and dimensioned to fit snugly about the head portion of a lubrication fitting which communicates with a bearing of a motor vehicle or the like, a bore in the portion to be attached to the lubrication source, gasket means for forming a fluid tight seal at the interface between the end of the fitting and the wall of the cavity and a removable retainment clip extending through the body and cavity against the fitting which secures the fitting against longitudinal movement in the cavity. In a preferred embodiment of the invention, the cavity which is shaped to fit snugly about the head of the fitting is a stepped bore with a shoulder therebetween for supporting an O-ring or similar gasket in a position where it will be compressed by the head of the fitting to seal the interface.

Referring now to the drawing, one embodiment of the connecting member 10 of the invention is shown in FIGS. 1 and 2 coupling a hose 12 and its internally threaded end coupling member 11 to a Zerk type fitting 13. Connecting member 10 has a tubular externally threaded end portion 15 and a body portion 16. A bore 17 extends longitudinally inwardly through the threaded end 15 and communicates with a coaxial bore in the hose 12. A counterbore 18 coaxial with bore 17 extends inwardly from the end of the body portion 16. An intermediate counterbore 19 is coaxial with bore 17 and counterbore 18 and is of larger diameter than bore 17 and of smaller diameter than counterbore 18. Shoulder 20 is formed by the juncture of counterbore 19 and bore 17. Counterbores 18 and 19 combine to provide a cavity for the head portion of fitting 13.

An elastomeric compressible O-ring gasket 25 is disposed in counterbore 19 and is compressed between shoulder 20 and the end of Zerk fitting 13 to seal the interface therebetween. The check valve 21 in Zerk fitting 13 communicates with bore 17 for the passage of lubricant through fitting 13 to the part to be lubricated. A substantially U-shaped wire retainment clip 14 (FIG. 5) is inserted through bores 22 and 23 and against the shoulder 31 of fitting 13 to prevent relative longitudinal movement between fitting 13 and connecting member 10.

The embodiment illustrated in FIG. 3 is similar to the one of FIGS. 1 and 2 having counterbores 18 and 19 combining to form a cavity for the head of Zerk fitting 13, shoulder 20, O-ring 25, and bores 22 and 23 for a clip 14. However, in this embodiment an internally threaded bored 17A in angular relationship to bore 27 is provided for connecting the adapter or connecting member 10 to an end coupling member 28 of a metering valve or feed line. In the embodiment shown, bore 17A has its longitudinal axis substantially perpendicular to the longitudinal axis of counterbore 19. Counterbore 19 is connected to bore 17A through intermediate bores 26 and 27 coaxial with counterbore 19.

The embodiment of a connecting member 10 illustrated in FIG. 4 is provided with an externally threaded end about a bore 17. This connecting member 10 also has a cavity formed by counterbores 18 and 19 which are connected through intermediate bores 26 and 27 to a bore 17. An O-ring 25 is disposed on shoulder 20. The outside diameter of O-ring 25 is such that it fits snugly while uncompressed in counterbore 19 and its internal diameter is smaller than the diameter of bore 26 so that a portion of O-ring 25 extends radially inwardly into bore 19 beyond shoulder 20. This arrangement adapts the cavity for accommodating Zerk fitting heads of somewhat different lengths because the end of fitting 13 can push O-ring 25 towards bore 26. O-ring 25 is compressed against shoulder 20 to seal the interface and retainment clip 14 is disposed about the Zerk fitting in a groove to prevent the fitting from moving longitudinally when a lubricant under pressure is charged through check valve 21.

Connecting member 10 of FIG. 4 is connected to a feed line 12 of a lubricating assembly by a compression nut 29 and sleeve 30.

Figure 7:
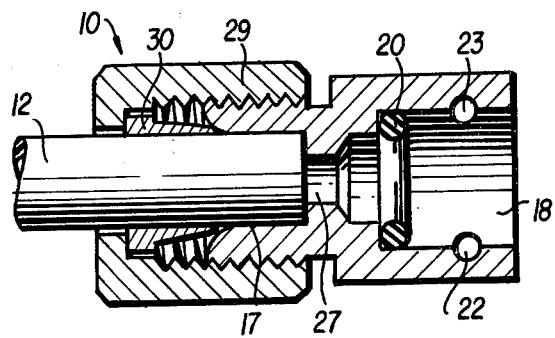
FIG. 7 is a longitudinal section of another embodiment of the invention.

FIG. 7 illustrates an embodiment wherein counterbore 18 itself extends inwardly to form annular shoulder 20.

Figure 6:
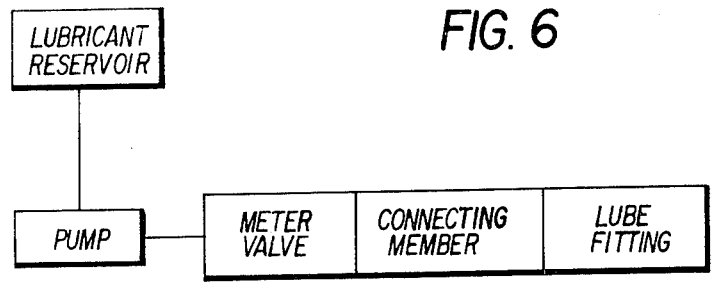
FIG. 6 is a diagrammatic illustration of a lubrication system which includes embodiments of the connecting member provided by the invention.

A lubrication system using the connecting member of the invention is illustrated diagrammatically in FIG. 6. The lubrication reservoir and pump may be, for example, the apparatus described in U.S. Pat. No. 3,659,675 and the metering valve may be the one described in U.S. Pat. No. 3,809,184.

Since the length and shape of Zerk fittings vary somewhat from one fitting to the other, each of the embodiments of the connecting member provided by the invention preferably has an O-ring and shoulder arrangement dimensional like that described above with respect to FIG. 4 to adapt the connecting member for use with the various modifications of the Zerk fitting. This embodiment can be used with the various types of Zerk fittings without variation in the diameter of the O-ring's cross-section because the portion of the O-ring extending radially inwardly from the shoulder will be extended under compression into bore 26, a distance depending upon the length of the Zerk fitting between its external groove and its end having the check valve.

The connecting member may be made from any suitable synthetic resinous material such as nylon, polycarbonate or the like or from metal. Preferably, brass is used because it is corrosion resistant and easily fabricated by conventional methods. The retainment clip may be stainless steel, or other suitable material. While the retainment clip preferably has a U-shape as shown in FIG. 5, two pins similar to the legs of the U-shaped clip may be used, if desired, so it is intended that the claims include two pins and other equivalent structures.

It is apparent from the foregoing that the connecting member provided by the invention can be installed or removed quickly from a Zerk type fitting and has the advantage of remaining in usable condition after it has been removed from a fitting. Moreover, the connecting member provides a relatively simple and inexpensive means for installing an automatic or manually actuated lubrication. Further, the design nature of the connecting member provides a rotatable contact relationship with the lubricator member during the assembly process and during the lubricating process thereby providing improved alignment means between the connecting member, the lubrication fitting and members attached to the connector member while further providing a fluid-seal relationship under normal pressures of the lubricating process.

The end of the connecting member to be attached to a feed line, metering valve or other source of lubricant may be provided with any type of connecting means required to be compatible with the lubrication system. It may be a compression nut and sleeve assembly like that shown in FIG. 4 of a conventional threaded female or male coupling, a flanged end or other known type of coupling member.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A coupling for a lubricating device comprising (a) a lubricant-receiving fitting having an enlarged head portion, a shoulder longitudinally spaced therefrom and an intermediate portion of smaller cross-section than the head and the shoulder disposed between said head and shoulder, (b) a source of lubricant terminating in a threaded end portion, (c) a tubular member having a body portion, a threaded end portion and an opposite end, said threaded end portions having longitudinally extending bores, (d) a threaded sleeve connecting the said threaded end portions together with their bores communicating with each other, said body portion having a first counterbore extending longitudinally inwardly from said opposite end of said tubular member, the longitudinal dimension of the said first counterbore being about equal to the longitudinal dimension of said head and said intermediate portion of the fitting, a second counterbore between the first counterbore and the bore in the threaded end portion of the tubular member, an O-ring disposed in the second counterbore, the head and intermediate portions of said fitting being disposed in the first counterbore with the head pressing the O-ring in said second counterbore against the shoulder formed by the juncture of the second counterbore with the bore in the tubular member, and with the said shoulder of the fitting pressing against said opposite end of the tubular member, a pair of holes through the tubular member having portions of their cross-sections through the first counterbore disposed on opposite sides of the head of the fitting on that side thereof facing said intermediate portion and a clip having its legs inserted through said holes and abutting the head of the fitting thereby holding the fitting in the first counterbore in a position where the said O-ring is compressed and said shoulder of the fitting is pressed against said opposite end of the tubular member.

2. The coupling of claim 1 wherein the thickness of the O-ring is larger than the radial dimension of the shoulder formed by the juncture of the second counterbore and the bore in the tubular member whereby a portion of the O-ring is pressed into the bore.

3. A coupling for a lubricating device comprising (a) a lubricant-receiving fitting having an enlarged head portion, a shoulder longitudinally spaced therefrom and an intermediate portion of smaller cross-section than the head and the shoulder disposed between said head and shoulder, (b) a source of lubricant terminating in a threaded end portion, (c) a fitting receiving member having a body portion, a threaded end portion and an opposite end, said threaded end portions having longitudinally extending bores, means threadably coupling said end portions together with their bores communicating with each other, said body portion having a counterbore extending longitudinally inwardly from said opposite end of said fitting receiving member, the longitudinal dimension of the said counterbore being about equal to the longitudinal dimension of said head and said intermediate portion of the fitting, a compressible resilient sealing means disposed in the counterbore, the head and intermediate portions of said fitting being disposed in the counterbore with the head compressing the sealing means in said counterbore against the shoulder formed by the juncture of the counterbore with the bore in the fitting receiving member, a pair of holes through the fitting receiving member having portions of their cross-sections through the counterbore disposed on opposite sides of the head of the fitting on that side thereof facing said intermediate portion and a removable retainment means inserted through said holes and abutting the head of the fitting thereby securing the said head in the counterbore in a position where said sealing means is compressed.

4. The connecting member of claim 3 wherein said sealing means is an elastomeric O-ring.

5. The connecting member of claim 3 wherein the bore of the feed line member communicates in a substantially coaxial relationship with the bore of said fitting receiving member.

6. The connecting member of claim 3 wherein the bore of the feed line member communicates in a substantially angular relationship with the bore of said fitting receiving member.

7. The connecting member of claim 3 wherein said removable retainment means comprises a pair of elongate pins.

8. The connecting member of claim 3 wherein said removable retainment means comprises a clip having a substantially U-shaped form.

9. The connecting member of claim 3 wherein said removable retainment means comprises a wire clip.

10. The coupling of claim 3 wherein the thickness of the sealing means is larger than the radial dimension of the shoulder formed by the juncture of the counterbore and the bore in the tubular member whereby a portion of the sealing means is pressed into the bore.

11. The coupling as in claim 3 wherein the said fitting is held in pressing engagement with the opposite end of the fitting receiving member by said retainment means.

12. The coupling of claim 3 wherein said threaded end portions are coupled together via a threaded sleeve connecting said threaded end portions together.

13. The coupling of claim 3 wherein said counterbore comprises a first counterbore extending longitudinally inwardly from said opposite end of said fitting receiving member and having a longitudinal dimension about equal to the longitudinal dimension of said head and said intermediate portion of the fitting and a second counterbore between said first counterbore and the bore in the threaded end portion of the fitting receiving member, said compressible resilient sealing means being disposed in said second counterbore, the head and intermediate portions of said fitting being disposed in the first counterbore with the head compressing the sealing means in said second counterbore against the shoulder formed by the juncture of the second counterbore with the bore in the fitting receiving member, said pair of holes having portions of their cross-sections through said first counterbore.

14. A coupling for a lubricating device comprising (a) a lubricant-receiving fitting having at one end thereof an enlarged head portion having a side thereof for receiving the lubricant and a side opposite thereto which faces away from the lubricant receiving side towards an intermediate portion of the fitting of smaller cross-section than the head and disposed longitudinally therefrom between the head and a shoulder on the fitting which faces towards the said opposite side, (b) a source of lubricant terminating in an externally threaded end portion, (c) a connecting member having a body portion, an externally threaded end portion and an opposite end, said threaded end portions having longitudinally extending bores, (d) an internally threaded sleeve connecting the said threaded end portions together with their bores communicating with each other, said body portion having a first counterbore extending longitudinally inwardly from said opposite end of said connecting member, the longitudinal dimension of the said first counterbore being about equal to the longitudinal dimension of said head and said intermediate portion of the fitting, a second counterbore between the first counterbore and the bore in the threaded end portion of the connecting member, an O-ring disposed in the second counterbore, the head and intermediate portions of said fitting being disposed in the first counterbore with the head compressing the O-ring in said second counterbore against the shoulder formed by the junction of the second counterbore with the bore in the connecting member, and with the said shoulder of the fitting pressing against said opposite end of the connecting member, a pair of holes through the connecting member having portions of their cross-sections through the first counterbore disposed on opposite sides of the head of the fitting on the said side thereof facing said intermediate portion, and a clip having its legs inserted through said holes and against the said opposite side of the head in such a manner as to secure the lubricant-receiving side of the head in the first counterbore in a position where it compresses said O-ring and prevents longitudinal movement between the fitting and the connecting member.

15. The coupling of claim 14 where a portion of the compressed O-ring extends into the bore of the connecting member.

16. A coupling for a lubricating device comprising (a) a lubricant-receiving fitting having at one end thereof an enlarged head portion having a side thereof for receiving the lubricant and a side opposite thereto which faces away from the lubricant-receiving side towards an intermediate portion of the fitting of smaller cross-section than the head and disposed longitudinally therefrom between the head and a shoulder on the fitting which faces towards the said opposite side, (b) a source of lubricant terminating in a threaded end portion, (c) a fitting connecting member having a body portion, a threaded end portion and an opposite end, said threaded end portions having longitudinally extending bores and being coupled together with their bores communicating with each other, said body portion having a counterbore extending longitudinally inwardly from said opposite end of said fitting connecting member, the longitudinal dimension of the said counterbore being about equal to the longitudinal dimension of said head and said intermediate portion of the fitting, a compressible resilient sealing means disposed in the counterbore, the head and intermediate portions of said fitting being disposed in the counterbore with the lubricant-receiving side of the head compressing the sealing means in said counterbore against the shoulder formed by the juncture of the counterbore with the bore in the fitting connecting member, a pair of holes through the fitting connecting member having portions of their cross-sections through the counterbore disposed on opposite sides of the head of the fitting on the said side thereof facing said intermediate portion, and a removable retainment means inserted through said holes and against the said opposite side of the head in such a manner as to secure the lubricant-receiving side of the head in the counterbore in a position where it compresses said sealing means and prevents longitudinal movement between the fitting and the connecting member.

17. The coupling of claim 16 wherein a portion of the compressed O-ring extends into the bore of the connecting member.

18. The coupling of claim 16 wherein the shoulder of said fitting presses against the opposite end of the fitting connecting member.

* * * * *